United States Patent [19]
Jansson

[11] 4,057,406
[45] Nov. 8, 1977

[54] APPARATUS FOR REMOVING GAS FILTER
[75] Inventor: Staffan Jansson, Vaxjo, Sweden
[73] Assignee: AB Svenska Flaktfabriken, Nacka, Sweden
[21] Appl. No.: 647,308
[22] Filed: Jan. 8, 1976
[30] Foreign Application Priority Data
    Jan. 13, 1975    Sweden .............................. 7500295
[51] Int. Cl.² ............................................ B01D 50/00
[52] U.S. Cl. .................................... 55/385 R; 55/378; 248/99
[58] Field of Search ........... 55/356, 148, 378, DIG. 9, 55/385 R; 150/52 R; 248/97–100; 53/390

[56]         References Cited
        U.S. PATENT DOCUMENTS

| 1,558,169 | 10/1925 | Hume | 248/97 |
| 3,354,616 | 11/1967 | Lucas | 55/96 |
| 3,690,045 | 9/1972 | Neumann | 55/356 |
| 3,872,906 | 3/1975 | Bolanz | 248/523 |

FOREIGN PATENT DOCUMENTS 1,091,415  10/1960  Germany .............................. 55/481

Primary Examiner—Bernard Nozick
Attorney, Agent, or Firm—Howson and Howson

[57]        ABSTRACT

A stand provided with a bag positioned over an opening to remove filter.

10 Claims, 3 Drawing Figures

APPARATUS FOR REMOVING GAS FILTER

This invention relates to apparatus and method for removing gas filters, for example air filters, for purposes such as inspection and/or emptying of the filters.

In the removal of filters, especially bag filters, until now it has been customary to raise the filters from their working position for the purpose of inspection or cleaning and then return them to their working position or deposit them, for example, in a paper bag in the case of an exchange of filter. Thereby it was unavoidable that the dust in and on the filter began whirling and spreading whereby the operating personnel came in contact with the dust, which was often dangerous for their health. A person who is frequently working under such conditions is exposed to serious health risks which in general can cause health damages.

The object of this invention is therefore chiefly to counteract and to eliminate as much as possible the abovementioned nuisances. An additional task of this invention consists in a general improvement and further development of the state of the art.

These problems are solved according to the invention by means of an apparatus and method defined by the appended claims. Particular features and advantages of the invention will be described with particular reference to the attached drawings, in which:

Figure 2:
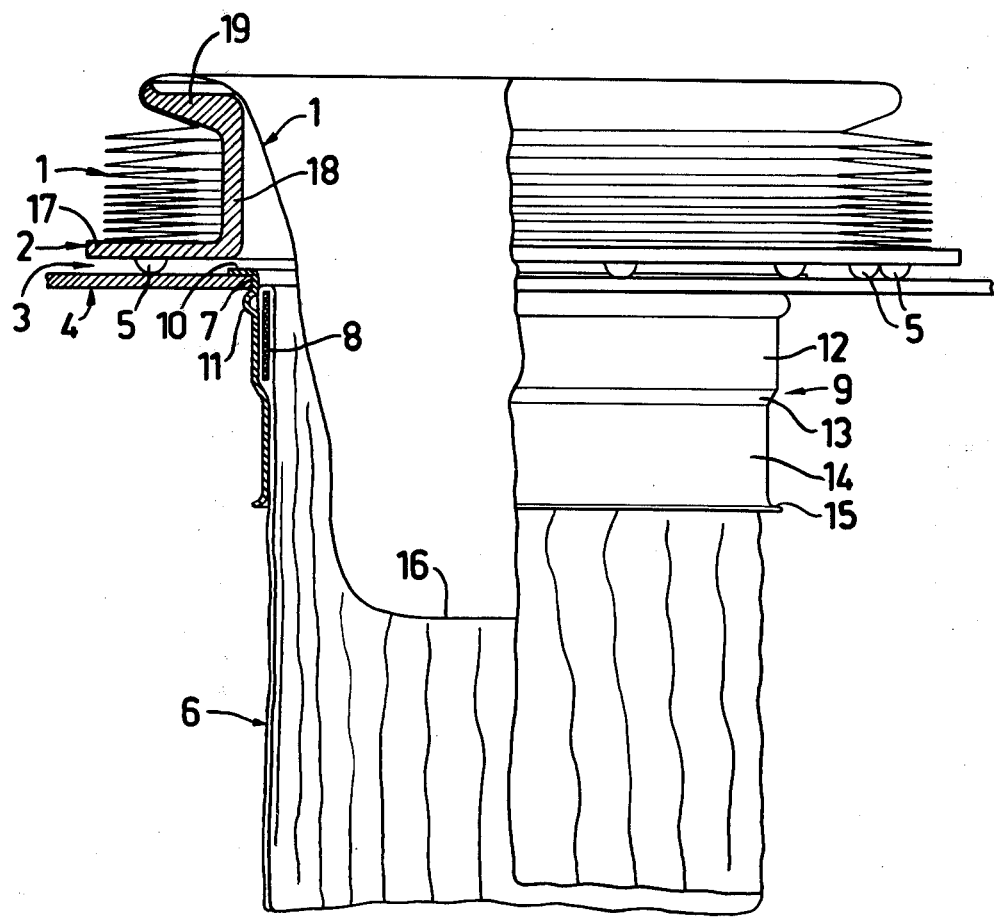
FIG. 2 is a similar view of a modified form of the invention.
Figure 3:
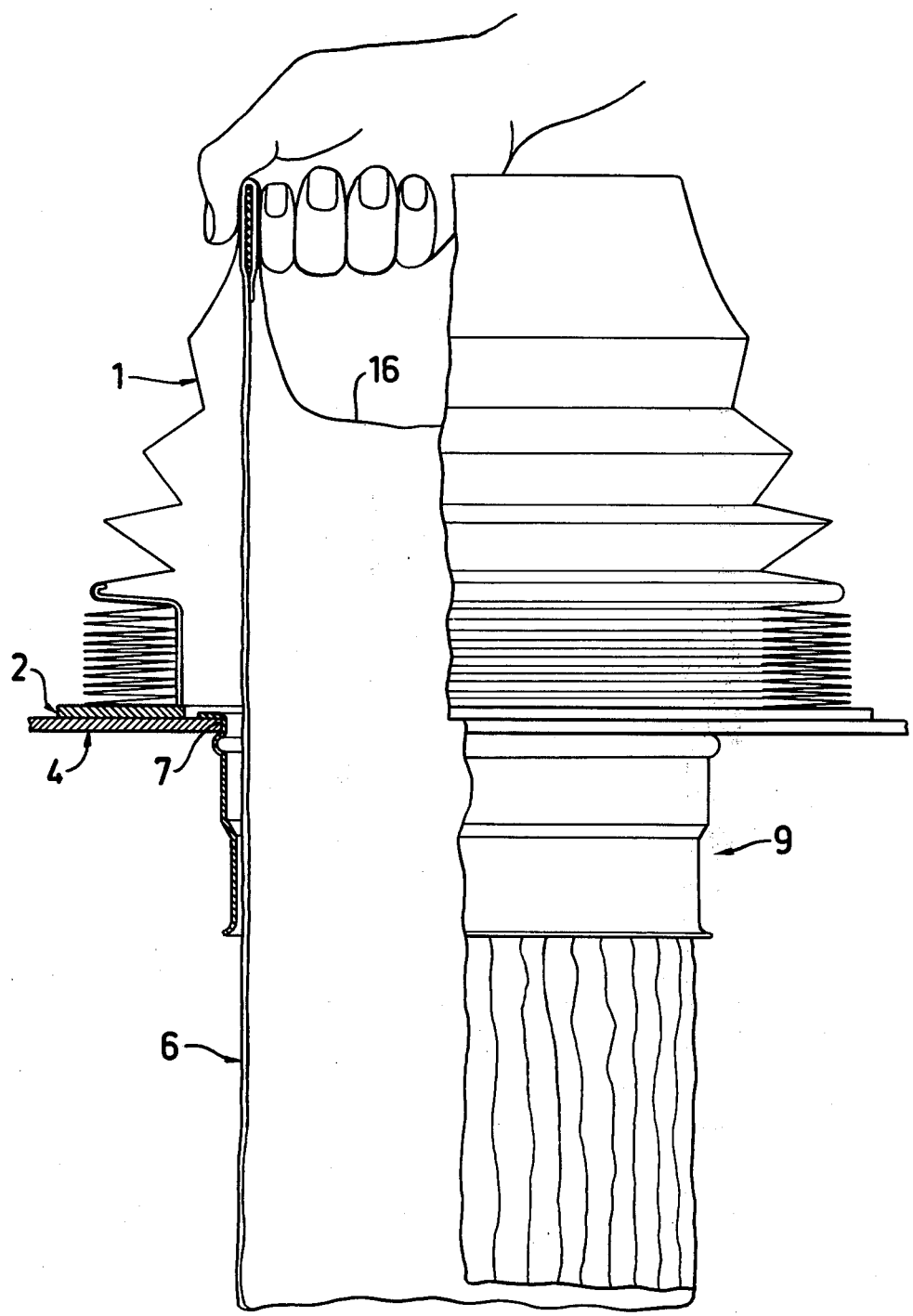
FIG. 3 is a similar view of a device according to FIG. 1 as it appears during removal of a bag filter.

In the drawings, 4 designates the wall of a filtering device. The wall has an opening 7 in or on which is fixed one end 8 of a filter 6, preferably a bag filter. The fixing of this filter end allows an advantageous and rapid assembly and disassembly, and may be accomplished as shown and described in my co-pending U.S. patent application Ser. No. 647,306 entitled Gas Filter Locking Apparatus and filed concurrently herewith. In FIGS. 2 and 3 is shown a certain mode of such a filter fixing by way of example only, and the invention is in no way limited to this. Any arbitrary form of filter fixing can therefore be used. With the illustrated arrangement, in the opening 7 is inserted a tubular socket 9 which is fixed in regard to opening 7 by means of a flange 10 on one side and by means of a rim or bulge 11 on the other side. Below rim 11 the socket 9 has a section 12 for the receipt of the peripherally thickened filter end 8, and in connection with and below this section there is provided a converging phase 13, a section 14 of a reduced diameter, and finally a trumpet-like widening of the lower free terminal edge 15. The function, condition and advantages of the parts 5-12 are evident from the drawings and the above-identified co-pending application, so that no further description is necessary.

Figure 1:
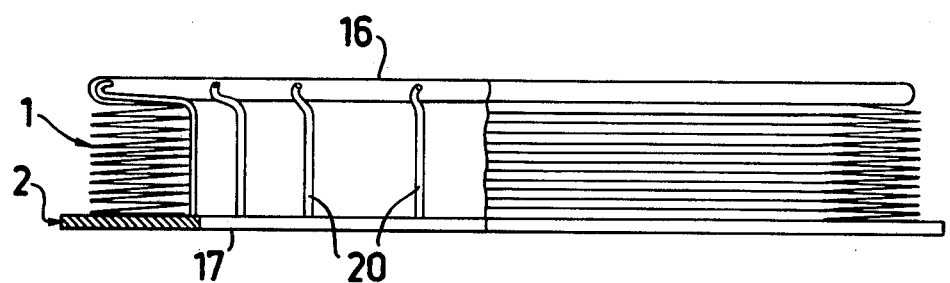
FIG. 1 is a side view, partly in section, showing one preferred design of a device which may be used in the invention.

In the drawings, 1 designates a tube-shaped open-mouthed bag preferably made of transparent plastic material, which in FIGS. 1 and 2 is folded in the form of an annular bellows surrounding a stand designated 2.

A preferred design of stand 2 shown in FIG. 2 comprises a flat ring 17 from whose inner edge extends perpendicularly a cylindrical web 18, which on its other end is provided with the outward directed flange 19 whose width is preferably smaller than the width of ring 17. It can be advantageous to increase the 90° angle between the flange 19 and the web 18 for example to 100°-140°. While the ring 17 is preferably solid and complete, web 18 and flange 19 can according to the alternative design of FIG. 1 consist of wires 20 welded to a ring 17 shaped as previously mentioned. At their free end, wires 20 are bent upwards and then outwards.

A thus described device is utilized as follows: As shown in FIGS. 2 and 3, the stand provided with a folded bag is placed concentrically around opening 7 on the wall 4 of the filtering device, on the opposite side from filter 6. Preceding this, any means for fixing or locking the filter, such as a locking cylinder or other device, may be removed or released. After this, bottom 16 of the bag is pressed by hand into the open top of the filter, as shown in FIG. 2. Next one grasps filter end 8 through the material of bag 1, whereby the bag functions as a dust-arresting and protecting diaphragm. After this the filter can be manually raised as shown in FIG. 3, whereby the bellows-like folded bag follows automatically and encircles the entire filter or a desired part of it. If the filter is only to be inspected, it can be then returned to its working position. If a cleaning of the filter is required, it can, as shown in FIG. 3 be shaken around together with the bag so that loosened dust cannot penetrate the atmosphere surrounding the operating personnel. However, if the entire filter has to be removed or replaced, it is raised completely until its lower end is above stand 2, whereupon one grasps the bag with his hand, between the stand and the lower filter end, in order to compress the bag in this range and close it. This can be accomplished in itself by known separate means or by tying the bag end in a knot, or also the bag can be provided with self-sealing portions.

As already mentioned, it is difficult to prevent dust from escaping from the filter in connection with its manipulation, i.e. during the manipulation of a dusty filter. In this regard the invention has great importance, not only because the above-described procedure protects the operating personnel from the contaminated surrounding atmosphere caused by the filtering device but also because of further advantageous effects which will be more exactly described in the following.

When the filter is raised into the position shown in FIG. 3 and even further upwards, in the device according to the invention there is formed a draft inside as well as outside of the filter, due to sucking of air into the bag. In this way at least a part of the dusty air or gas is sucked into the bag instead of spreading inside the filtering device or outside of it.

In certain cases it can be less desirable for the draft to extend into the interior of the filtering device, because this can cause an increased whirling of the dust. In such cases and in others, it can be advantageous to provide ring 17 on its lower side with spacers 5 as shown in FIG. 2, for example in the form of knobs or ribs spacing the ring from the upper side of wall 4, and thus allowing the atmosphere surrounding the operating personnel to communicate with the zone inside web 18. This causes that the draft, in connection with the raising of the filter or its removal, to proceed and extend through gap 3 at least partially due to the spacers 5, into the zone between the filter and the bag. A certain part of the thus sucked-in air can of course penetrate also the filter itself.

If the stand has to be applied repeatedly, it will be preferably provided with a certain weight such that the device according to the invention will during its operation rest securely in its place. Especially in cases where a heavy design of the stand is not desirable, the latter can be designed for use in only a single application and then thrown away together with the bag.

In its simplest design the device according to the invention can consist merely of a folded bellows bag. The lower or free end of the bag can in this case be temporarily fixed in a different way in the area around the filter end. One possibility in this case is for the mentioned bag to be provided with a self-sealing layer or with a ring-shaped flange having a self-sealing layer, which layer is temporarily fixed to wall 4, and when this layer is removed the bag can be conveniently closed by pressing its opposite self-sealing surfaces against each other. Of course, such a self-sealing layer can exist also on the bags that are supported by the stand, and they can be closed in the above-described same way. In this case the self-sealing layer can be initially provided for the fixing of the folded bag on the stand. Especially in such a case, but of course also in general, flange 19 can be reduced or it can be completely absent. Instead of flange 19, web 18 can also diverge from ring 17. Furthermore, it is also possible to use a tube open on both ends instead of the bag with its bottom. Such a tube, folded on the stand, can be provided longitudinally for a multitude of filters. It can be also furnished with self-sealing layers which in the glued-together state form both end parts of the tube. Between the individual sections, which are in each case provided for a single filter, there can be provided tear-off lines, such as perforations or the like, in the case that the tube is continuous i.e. intended for several filters. Of course, there can also be several separate tubes simultaneously positioned on a single stand.

The above described and shown designs must be considered only as examples within the range of the inventive idea. Thus the invention is by no means dependent on bag-type filters specifically, and use of other conceivable filter designs is, of course, covered by the invention. The bag or the tube need not consist of transparent or plastic material. It can, for example, be made of paper or textile materials. The invention is not limited even in the widest generalization to the exchange of similar filters. It is, of course, applicable in all conceivable domains, where any kind of substance or matter must be exchanged, cleaned or inspected. Furthermore it can be said that in the case of the application of a support ring firmly pressed against the wall of the filtering device around the filter opening, the ring can be provided with a special seal on its lower side. The bag and the tube need not be in the form of a folded bellows, although this could be the most advantageous design. Finally, the stnad can be also made of magnetic material so that a stand of a relatively light weight will rest securely on the wall of the filtering device around the filter opening. In the case that the tube is provided in accordance with the previously mentioned ring-formed flange with a self-sealing layer for temproarily fixing the tube on the wall as the case may be to form a seal in the case of a filter exchange, whereby such a flange is folded into a halfring shaped seal, such a seal can be advantageously used as a lifting handle for the bag containing the exchanged filter. Eventually the ring flange can be made, for example, of cardboard provided with two fold marks in the form of radial slits on two diametrically opposed points.

What is claimed is:

1. In combination with a filter mounted in a working position adjacent and on one side of an opening in a wall, apparatus for enabling the lifting of said filter from its working position on said one side of said wall, through said opening in said wall and into the open environment on the other side of said wall, without substantial dispersal of dirt from said filter into said open environment, comprising:
    a annular portable centrally-apertured stand comprising a ring having a circumferential web extending upwardly therefrom and having a passage extending through it of diameter large enough for said filter to be at least partially removed through it, and removably positioned over said opening on the opposite side of said wall from filter, with said passage aligned with said opening;
    tubular means of flexible material having one end disposed about an outer portion of said stand and secured to said stand so that the interior of one end of said tubular means surrounds the space directly above said opening in said wall, whereby at least a portion of said tubular means can be manually stripped from said stand and said filter can be withdrawn through said opening into said tubular means by grasping said filter through said flexible material of said tubular means;
    said stand being adapted temporarily to maintain its position over said opening and on the surface of said wall on said one side thereof, despite normal forces tending to displace it produced in response to said removing of said filter through said opening.

2. The apparatus of claim 1, in which said surface of said wall is substantially horizontal, and the mass of said stand is sufficient to provide said maintaining thereof in said position on said horizontal wall surface.

3. The apparatus of claim 1, wherein said stand is at least in part of magnetized material and the adjacent portion of said wall is of ferromagnetic material, so as to enhance the positional stability of said stand on said wall.

4. The apparatus of claim 1, wherein said stand comprises a ring portion adapted to be positioned about and adjacent said wall opening, the web portion extending upward from said ring portion, and retaining means for retaining said tubular means comprising a flange-like portion of said stand extending radially outward from a part of said web spaced above said ring portion; said tubular means having an open end surrounding said web, said ring portion and said retaining means serving to receive and retain said end of said tubular means and to store at least a part of said tubular means in folded position along said web when not in use.

5. The apparatus of claim 4, wherein at least the portion of said tubular means adjacent said open end thereof is folded in a bellows-like configuration.

6. The apparatus of claim 4, wherein said ring portion is generally flat on the side thereof to be placed adjacent said wall.

7. The apparatus of claim 4, wherein said flangelike portion extends radially outwardly to a diameter slightly less than the inner diameter of said one end of said tubular means, and said ring portion extends radially outward beyond said flange-like portion and beyond the outer diameter of the portion of said tubular means stored on said web portion.

8. The apparatus of claim 4, wherein the outer surfaces of said flange-like portion and of said web portion form with each other an angle substantially greater than 90°.

9. The apparatus of claim 4, wherein said stand comprises a single, unitary, generally-annular member of which said ring portion, said web portion and said flange-like portion are integral continuous parts.

10. The apparatus of claim 4, comprising spaced-apart spacer means extending downwardly from the lower surface of said ring portion for permitting flow of air between said ring portion and said wall when said stand is in position on said wall.

* * * * *